United States Patent [19]

Iwasaki et al.

[11] Patent Number: 6,148,252
[45] Date of Patent: Nov. 14, 2000

[54] AUTOMOTIVE SUSPENSION CONTROL SYSTEM UTILIZING VARIABLE DAMPING FORCE SHOCK ABSORBER

[75] Inventors: Katsuya Iwasaki; Hiroshi Hoya; Makoto Kimura, all of Atsugi, Japan

[73] Assignee: Unisia Jecs Corporation, Kanagawa, Japan

[21] Appl. No.: 08/041,209

[22] Filed: Apr. 1, 1993

[30] Foreign Application Priority Data

Apr. 10, 1992 [JP] Japan ................................ 4-022822 U
May 20, 1992 [JP] Japan ................................ 4-033204 U

[51] Int. Cl.[7] .................................................. B60G 17/00
[52] U.S. Cl. .................................... 701/37; 701/48; 703/8
[58] Field of Search ............................... 364/424.05, 424; 280/707; 701/37, 38, 36, 48; 703/8

[56] References Cited

U.S. PATENT DOCUMENTS

| | | | |
|---|---|---|---|
| 4,555,126 | 11/1985 | Ishimitsu et al. | 280/707 |
| 4,564,215 | 1/1986 | Kumagai et al. | 364/424.05 |
| 4,686,626 | 8/1987 | Kuroki et al. | 364/426 |
| 4,714,272 | 12/1987 | Buma et al. | 280/707 |
| 4,728,120 | 3/1988 | Buma et al. | 280/707 |
| 4,729,580 | 3/1988 | Buma et al. | 280/707 |
| 4,743,046 | 5/1988 | Schnittger | 280/707 |
| 4,744,589 | 5/1988 | Buma et al. | 280/707 |
| 4,975,849 | 12/1990 | Ema | 364/424.05 |
| 5,014,199 | 5/1991 | Konishi et al. | 364/424.05 |
| 5,016,908 | 5/1991 | Athanas et al. | 364/424.05 |
| 5,162,996 | 11/1992 | Matsumoto et al. | 364/424.05 |
| 5,203,584 | 4/1993 | Butsuen et al. | 364/424.05 |
| 5,253,174 | 10/1993 | Inagaki et al. | 364/424.05 |
| 5,267,466 | 12/1993 | Morris | 364/424.05 |
| 5,276,622 | 1/1994 | Miller et al. | 364/424.05 |
| 5,382,045 | 1/1995 | Takeda et al. | 280/707 |
| 5,398,184 | 3/1995 | Yamaoka et al. | 364/424.05 |

FOREIGN PATENT DOCUMENTS 6175007 9/1984 Japan .
63-305014 6/1987 Japan .

*Primary Examiner*—Kevin J. Teska
*Assistant Examiner*—Thai Phan
*Attorney, Agent, or Firm*—Ronald P. Kananen; Rader, Fishman & Grauer

[57] ABSTRACT

A suspension control system for an automotive vehicle is provided. This suspension control system comprises front and rear variable damping force shock absorbers and a control unit which controls the shock absorbers to assume damping force characteristics in a range between preselected higher and lower damping coefficients. The control unit controls the front and rear shock absorbers in a manner wherein the damping force characteristics of the front shock absorber in an extension stroke and of the rear shock absorber in a compression stroke are modified to the higher damping coefficients respectively when vehicle speed is substantially zero.

13 Claims, 17 Drawing Sheets

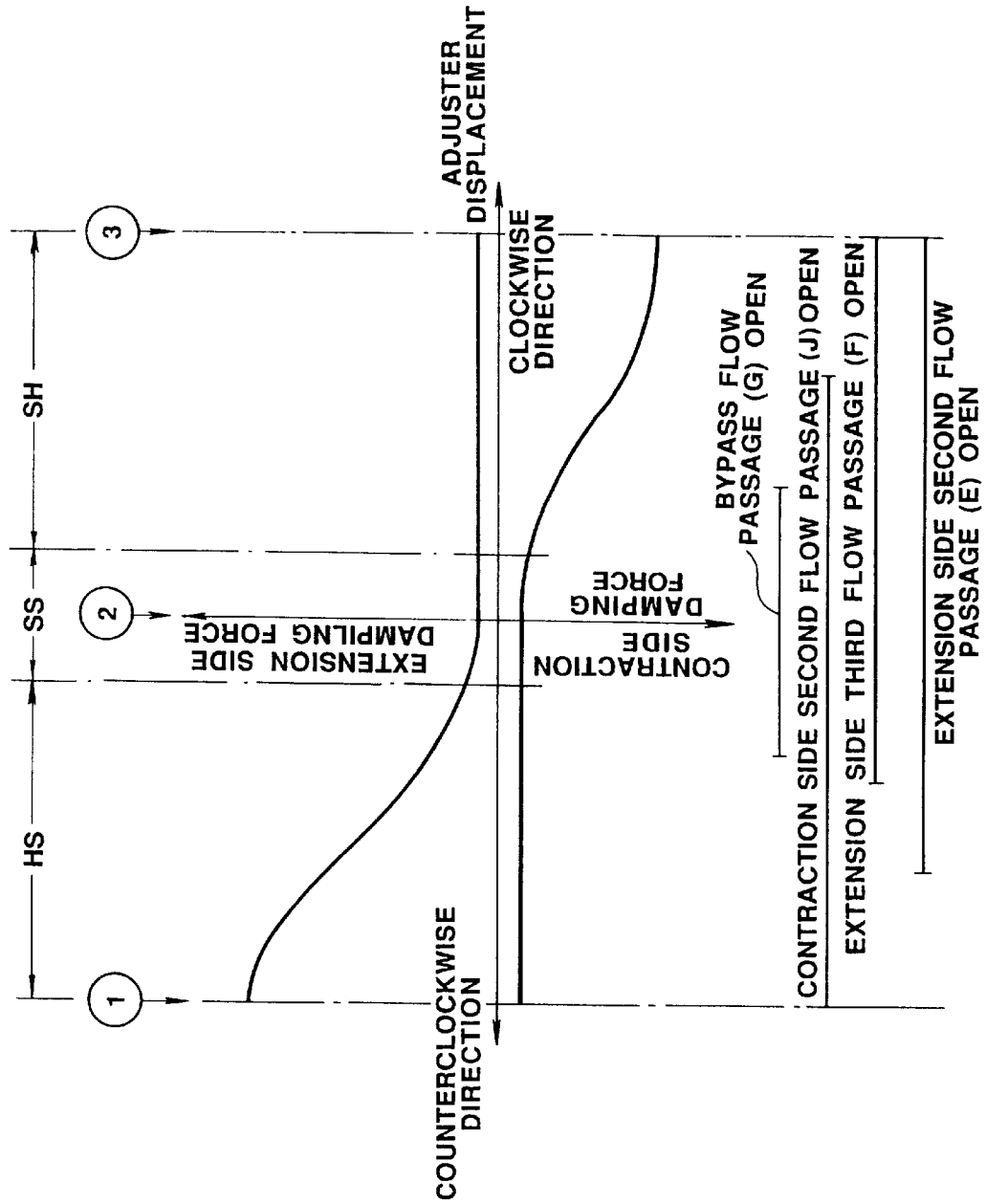

AUTOMOTIVE SUSPENSION CONTROL SYSTEM UTILIZING VARIABLE DAMPING FORCE SHOCK ABSORBER

BACKGROUND OF THE INVENTION

1. Field of the Invention

The present invention relates generally to a suspension control system for an automotive vehicle which utilizes variable damping force shock absorbers for suppressing nose-dive and/or squatting motion of a vehicle body when starting or braking as well as vertical vibrations during parking.

2. Description of the Prior Art

Japanese Patent First Publication No. 61-75007 discloses a suspension control system for controlling damping characteristics of shock absorbers. This system is operable to monitor depression of an accelerator pedal during traveling at a speed below a preselected value by means of vehicle speed, selector position, throttle opening, and longitudinal acceleration sensors for enhancing damping characteristics of the front shock absorbers in an extension or rebounding stroke and of the rear shock absorbers in a compression or bounding stroke when the depression of the accelerator pedal is over a preselected degree. With this damping characteristic modification, squatting motion of the vehicle body which may be caused by sudden acceleration of the vehicle while traveling at a relatively low speed is restricted.

However, since the above conventional suspension control system is responsive to signals from the various sensors indicative of a degree of depression of the accelerator pedal to modify the damping force characteristics of the shock absorbers, a time lag occurs between detection and a time when the damping force characteristics of the shock absorbers are actually modified, resulting in squatting motion of the vehicle body not being suppressed sufficiently when the vehicle starts quickly after being parked.

Additionally, Japanese Patent First Publication No. 63-305014 discloses a suspension control system which is adapted for suppressing nose-dive of a vehicle body during braking. This system projects vertical vibrational force acting on the vehicle body based on damping force of shock absorbers. When the projected vibrating force is less than a preselected threshold value, the shock absorbers are controlled to assume harder damping force characteristics, while above the threshold value, softer damping force characteristics are provided. Additionally, the system monitors braking operation when the shock absorbers are oriented to the softer damping force characteristics. If the vehicle is in braking operation, the shock absorbers are controlled to exhibit the harder damping force characteristics for suppressing nose-dive of the vehicle body and reaction therefrom when the vehicle stops.

However, such prior art suspension control systems encounter a drawback in that, during parking of the vehicle after braking operation, the system may be responsive to vertical motion of the vehicle body due to passengers getting in and/or out of the vehicle so as to switch the damping force characteristics of the shock absorbers unnecessarily, thereby causing power consumption to be increased as well as causing the shock absorbers to become degraded prematurely.

SUMMARY OF THE INVENTION

It is therefore a principal object of the present invention to avoid the disadvantages of the prior art.

It is another object of the invention to provide a suspension control system for an automotive vehicle which serves to modify a damping coefficient of a shock absorber for suppressing vehicle attitude change such as nose-dive and/or squatting motion effectively.

According to one aspect of the present invention, there is provided a suspension control system for an automotive vehicle which comprises a front shock absorber disposed between a vehicle body and a suspension member rotatably supporting a front wheel, the front shock absorber being controllable to assume damping force characteristics in a range between preselected higher and lower damping coefficients over extension and compression strokes, a rear shock absorber disposed between the vehicle body and a suspension member rotatably supporting a rear wheel, the rear shock absorber being controllable to assume damping force characteristics in the range between the preselected higher and lower damping coefficients over extension and compression strokes, a vehicle speed sensor means for detecting vehicle speed and providing a signal indicative thereof, and a control means responsive to the signal from the vehicle speed sensor means to provide control signals for controlling the front and rear shock absorbers in a manner wherein the damping force characteristics of the front shock absorber in the extension stroke and of the rear shock absorber in the compression stroke are modified to the higher damping coefficients respectively when the vehicle speed is substantially zero.

In the preferred mode, a vehicle attitude change detecting means may be provided for detecting vehicle attitude change and providing a signal indicative thereof, the control means providing the signals to control the front and rear shock absorbers so that the damping force characteristics of the front shock absorber in the extension stroke and of the rear shock absorber in the compression stroke are modified to the higher damping coefficients respectively when the vehicle speed is substantially zero and the vehicle attitude change is below a preselected degree.

The vehicle attitude change detecting means may be provided with a vertical speed determining means for determining vehicle speed of the vehicle body. The control means may hold the damping force characteristics at a preselected damping coefficient when the vehicle speed is substantially zero and the vertical speed remains below a preselected threshold value for a preselected period of time.

According to another aspect of the present invention, there is provided a suspension control system for an automotive vehicle which comprises shock absorbers disposed between a vehicle body and a suspension member rotatably supporting a wheel respectively, each shock absorber being controllable to assume damping force characteristics in a range between preselected higher and lower damping coefficients over extension and compression strokes, a vehicle speed sensor means for detecting vehicle speed and providing a signal indicative thereof, a vertical speed determining means for determining vertical speed of the vehicle body and providing a signal indicative thereof, and a control means responsive to the signals from the vehicle speed sensor means and the vertical speed determining means to provide control signals for controlling the shock absorbers in a manner wherein the damping force characteristics of the shock absorbers are maintained at a preselected damping coefficient within the range between the preselected higher and lower damping coefficients when the vehicle speed is substantially zero and the vertical speed is below a preselected threshold value for a preselected period of time.

BRIEF DESCRIPTION OF THE DRAWINGS

The present invention will be understood more fully from the detailed description given hereinbelow and from the accompanying drawings of the preferred embodiments of the invention. However, the drawings are not intended to imply limitation of the invention to a specific embodiment, but are for explanation and understanding only.

In the drawings:

FIG. 6 is a graph which shows a relation between an angular position of an adjusting pin and damping force of a shock absorber SA.

DESCRIPTION OF THE PREFERRED EMBODIMENT

Figure 1:
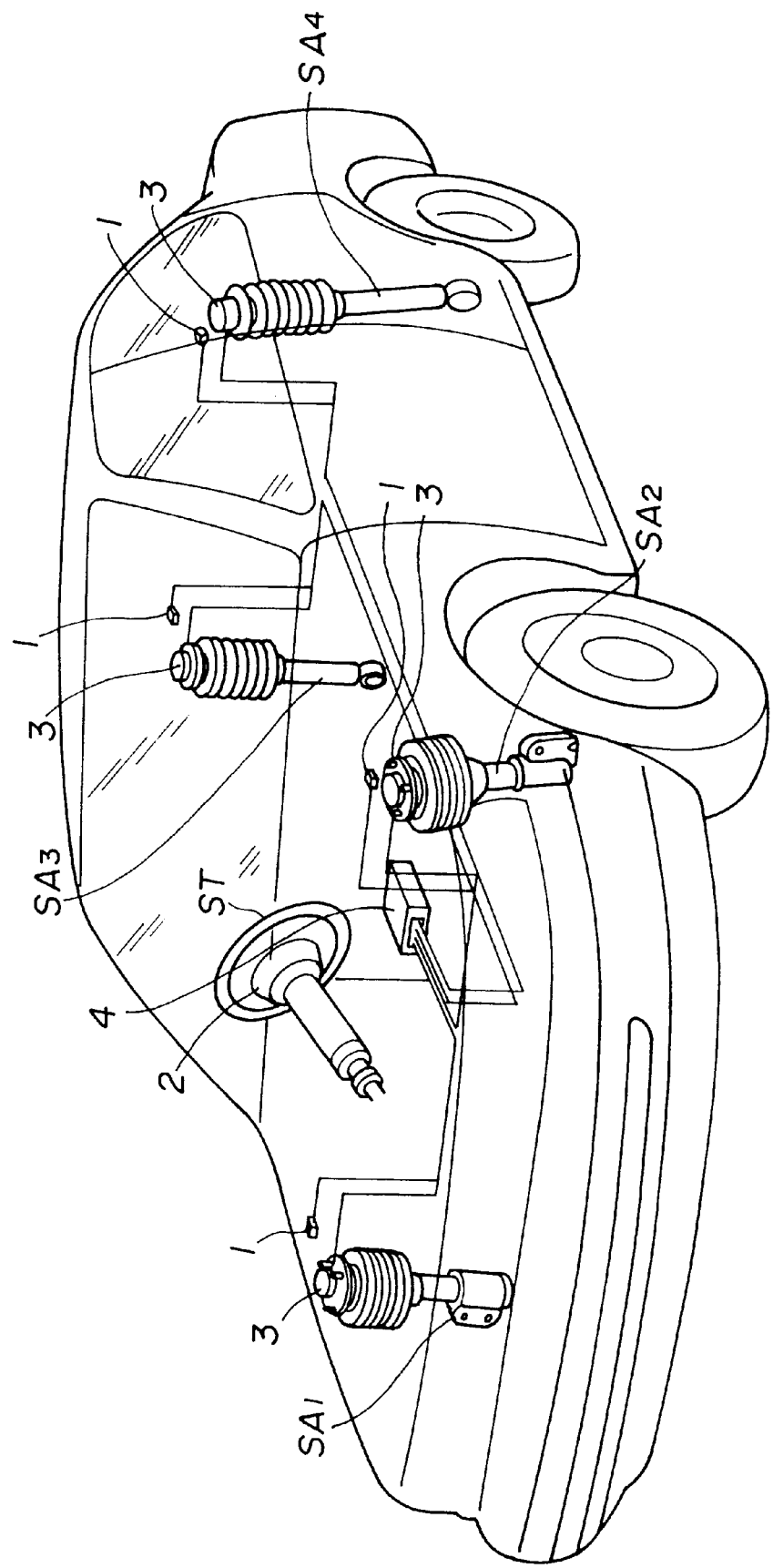
FIG. 1 is a perspective view which shows an automative vehicle incorporating a suspension control system according to the present invention.
Figure 2:
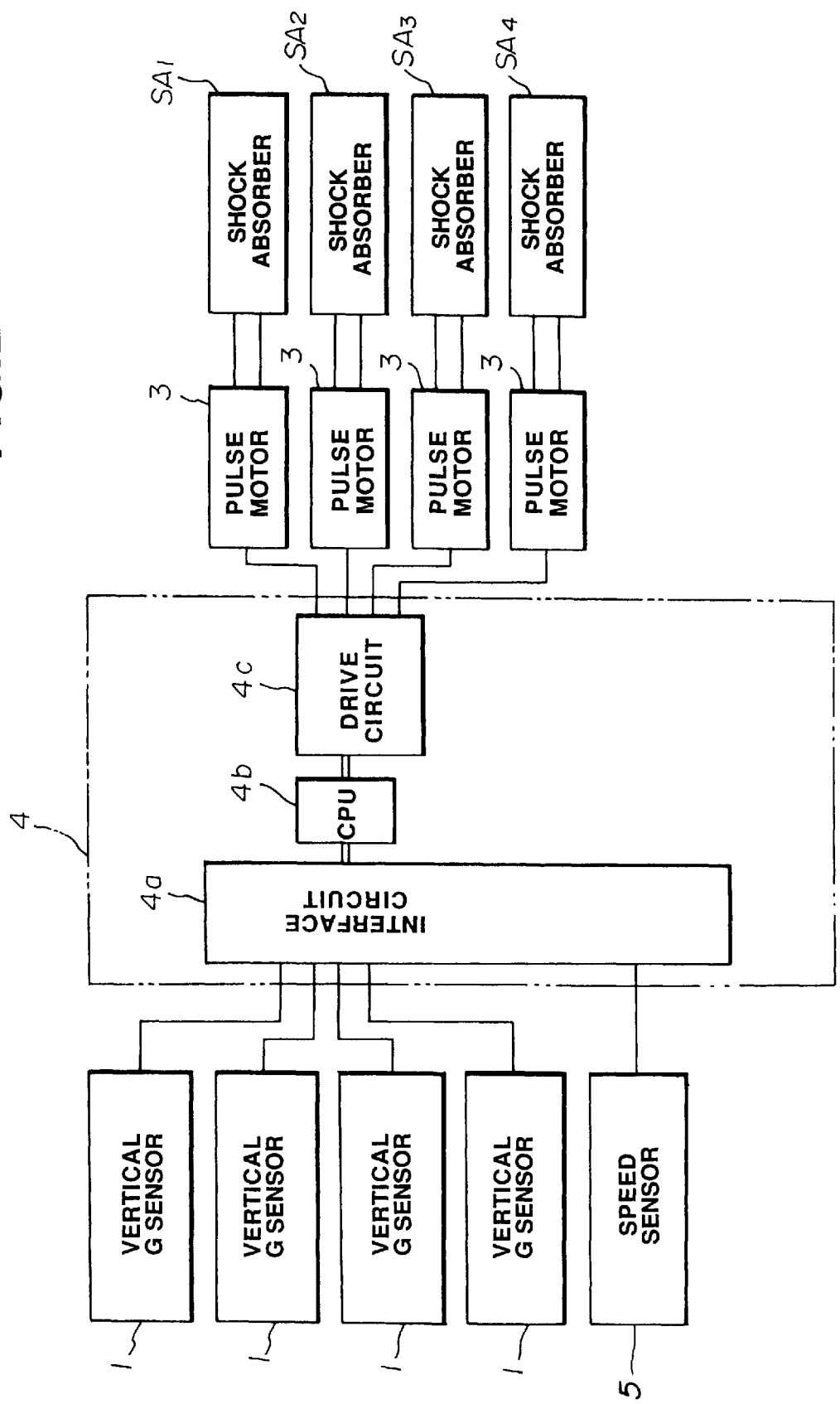
FIG. 2 is a block diagram which shows a suspension control system of the invention.

Referring now to the drawings, particularly to FIGS. 1 and 2, a suspension control system according to the present invention is shown. This control system comprises generally four suspension units which include front-right, front-left, rear-right, and rear-left shock absorbers $SA_1$, $SA_2$, $SA_3$, and $SA_4$, vertical acceleration sensors 1 (hereinafter, referred to as a vertical G sensor), a vehicle speed sensor 5, pulse motors 3 for controlling damping positions of the shock absorbers respectively, and a control unit 4. The shock absorber as generally referred to will be hereafter represented by "SA".

The shock absorbers SA is disposed between a vehicle body and a suspension member supporting a road wheel rotatably. The vertical G sensors 1 are mounted on portions of the vehicle body adjacent the shock absorbers for monitoring vertical accelerations acting on the vehicle body respectively to provide signals indicative thereof to the control unit 4. The control unit 4 is arranged adjacent a driver's seat and is operable to provide control signals to the pulse motors 3 for modifying damping force characteristics of the shock absorbers SA respectively to suppress vehicle attitude change.

The control unit 4 includes an interface circuit 4a, a CPU (Central Processing Unit) 4b, and a drive circuit 4c. Sensor signals from the vertical G sensors 1 and the vehicle speed sensor 5 are input to the interface circuit 4a.

Figure 3:
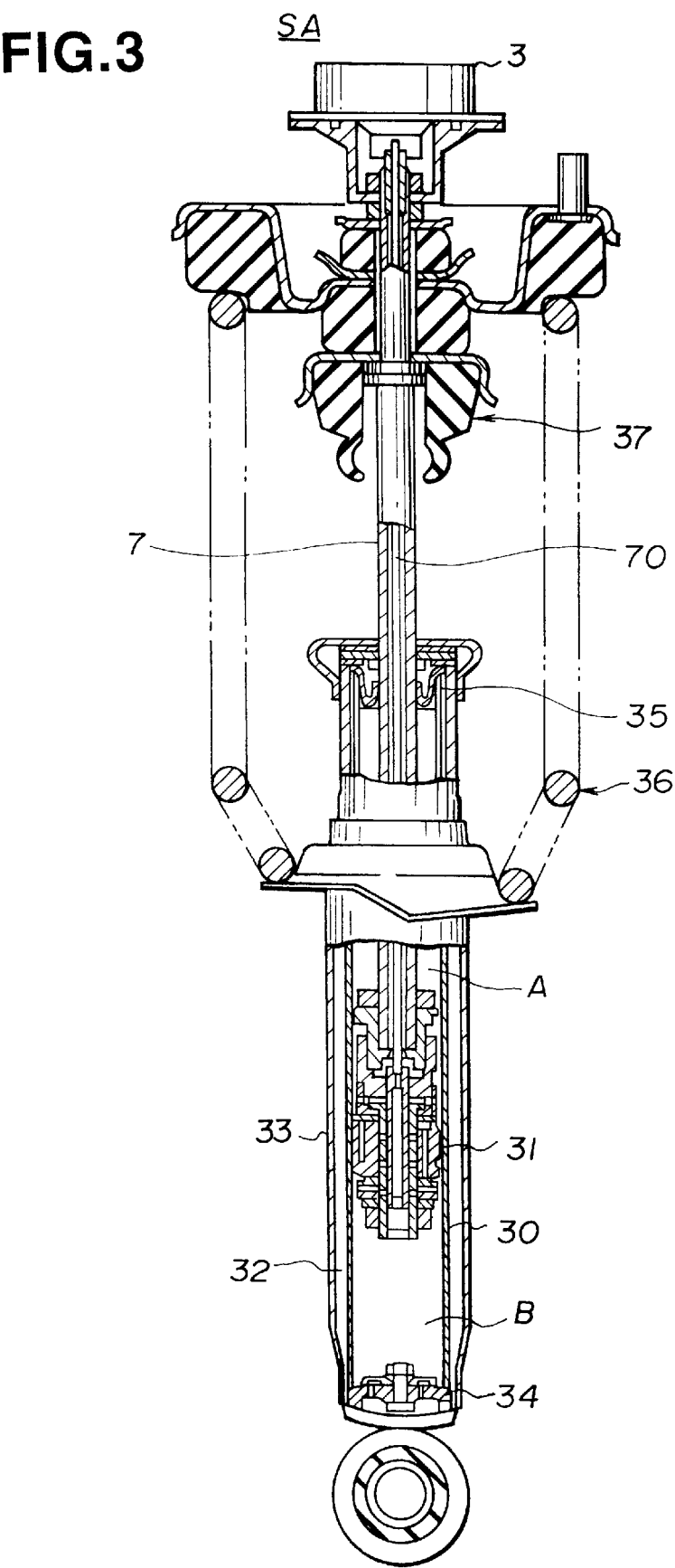
FIG. 3 is a cross-sectional view which shows a variable damping force shock absorber SA utilized for suppressing vehicle attitude change.

Referring to FIG. 3, a cross-sectional structure of the shock absorber SA is shown. The shock absorber SA includes an inner cylinder 30, a piston assembly 31 for defining an upper chamber A and a lower chamber B, an outer cylinder 33 for defining a reservoir chamber 32 between the outer cylinder 33 and the inner cylinder 30, a base or bottom member 34 for defining the lower chamber B and the reservoir chamber 32, a guide member for guiding slide movement of a piston rod 7 linked to the piston assembly 31, a suspension spring 36 interposed between a flange installed on the outer cylinder 33 and the vehicle body, and a bumper rubber member (or bushing) 37.

Figure 4:
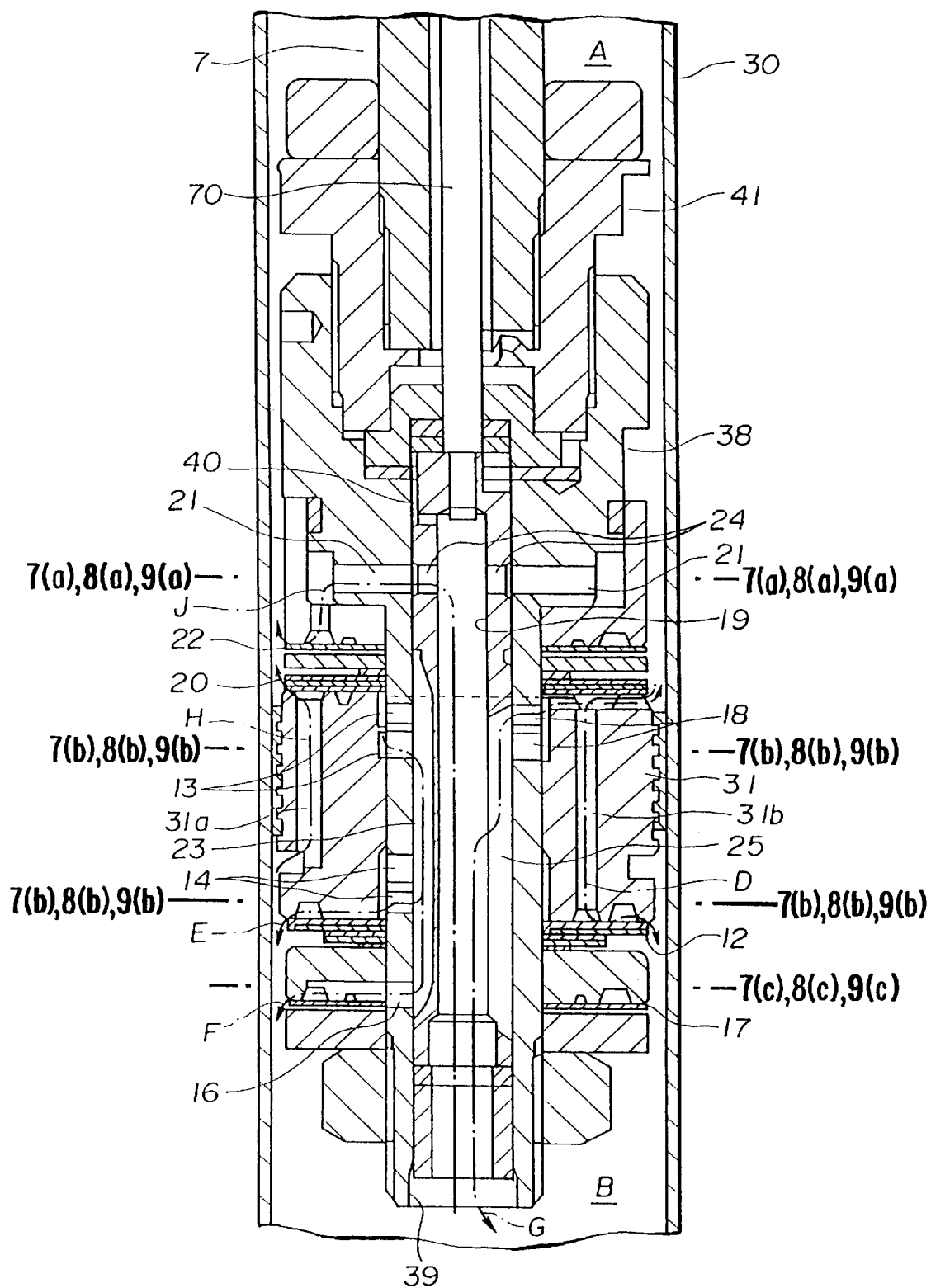
FIG. 4 is an enlarged cross-sectional view which shows a piston assembly of a shock absorber.

Referring to FIG. 4, there is shown a cross-sectional structure of the piston assembly 31. The piston assembly 31 includes penetrating holes 31a and 31b, an extension phase damping valve 12, and a compression phase damping valve 20. The extension and compression phase damping valves 12 and 20 serve to open and close the penetrating holes 31a and 31b respectively.

The piston assembly 31 further includes the piston rod 7, a communication hole 39, an adjusting pin 40, an extension phase check valve 17, a compression phase check valve 22, and a stud 38. The top end of the piston rod 7 is screwed into a bound stopper 41 which, in turn, is screwed into the stud 38 passing through the piston assembly 31. The communication hole 39 is formed in an end portion of the stud 38 which fluidly communicates between the upper chamber A and the lower chamber B. The adjusting pin 40 includes a hollow portion 19, a lateral hole 24, an axial slot 25, and a longitudinal groove 23 in an outer periphery thereof. The adjusting pin 40 is supported by the piston rod 7 so as to be allowed to circumferentially rotate for modifying a flow passage cross-sectional area of the communication hole 39. The rotational movement of the adjusting pin 40 is, as shown in FIG. 3, controlled by the pulse motor 3. The extension phase check valve 17 is operable to allow a working fluid to flow from the upper to lower chambers A and B, while the compression phase check valve 22 allows fluid flow from the lower to upper chambers B and A. Additionally, provided in an end portion of the piston rod 7 are a first port 21, a second port 13, a third port 18, a fourth port 14, and a fifth port 16 (as they will be referred to hereinafter).

Hence, four fluid flow passages are formed between the upper chamber A and the lower chamber B as fluid flow communicable passages during an extension or rebounding stroke of the shock absorber SA:

1) a first extension phase passage D directing fluid flow from the penetrating hole 31b to the lower chamber B through an inner side of the opened extension phase damping valve 12;

2) a second extension phase passage E directing fluid flow from the second port 13, the longitudinal hole 23, and the fourth port 14 to the lower chamber B through the outer periphery of the extension phase damping valve 12;

3) a third extension phase passage F directing fluid flow from the second port 13, the longitudinal hole 23, and the fifth port 16 to the lower chamber B via the opened extension phase check valve 17; and 4) a bypass flow passage G directing fluid flow from the third port 18 to the lower chamber B through the axial slot 25 and the hollow portion 19.

For the compression phase or during a bounding stroke of the shock absorber SA, the following three passages are provided as the fluid flow passages:

1) a first compression phase flow passage H directing fluid flow from the penetrating hole 31a to the upper chamber A through the opened compression phase damping valve 20;

2) a second compression phase flow passage J directing fluid flow from the hollow portion 19, the lateral hole 24, and the first port 21 to the upper chamber A through the opened compression phase check valve 22; and 3) a bypass flow passage G directing fluid flow from the hollow portion 19, the axial slot 25 and the third port 18 to the upper chamber A.

Figure 5:
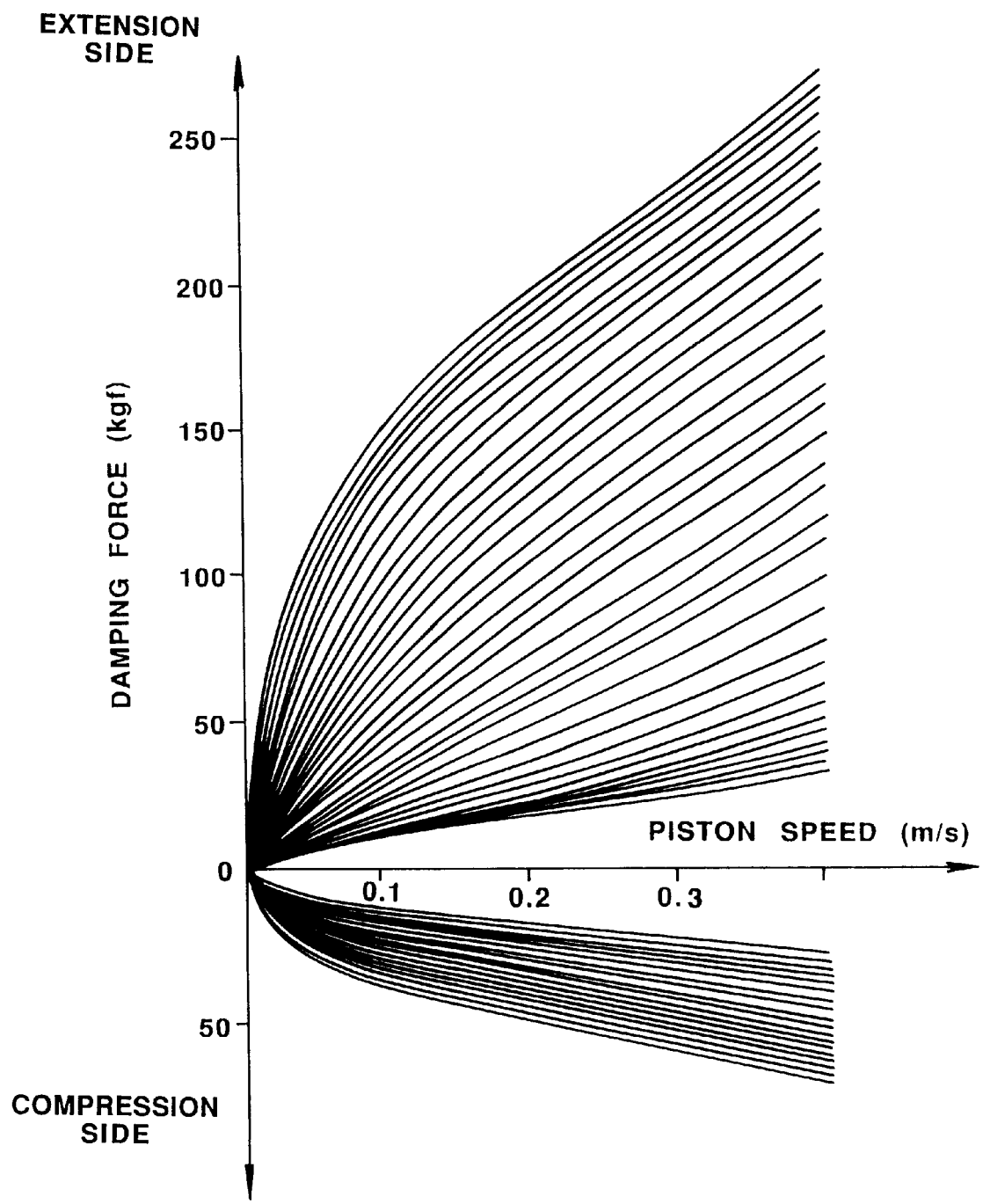
FIG. 5 is a graph which shows a relation between piston speed and damping force of a shock absorber SA.
Figure 7A:
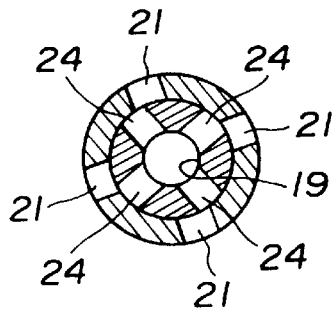
FIG. 7(a) is a cross-sectional view taken along the line K—K in FIG. 4 which shows an adjusting pin at a position ① in FIG. 6.
Figure 7B:
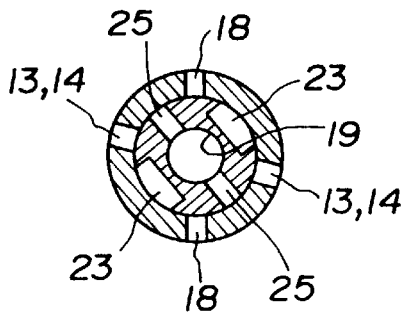
FIG. 7(b) is a cross-sectional view taken along the lines L—L and M—M in FIG. 4 which shows an adjusting pin at a position ① in FIG. 6.
Figure 7C:
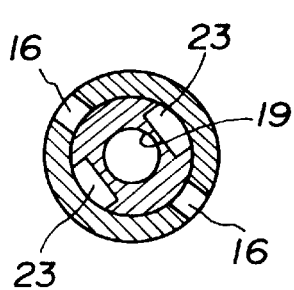
FIG. 7(c) is a cross-sectional view taken along the line N—N in FIG. 4 which shows an adjusting pin at a position ① in FIG. 6.
Figure 8A:
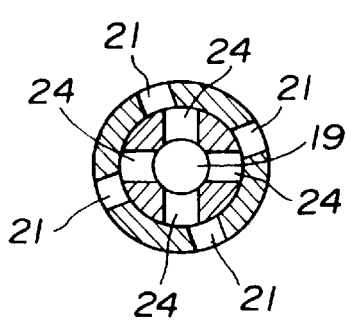
FIG. 8(a) is a cross-sectional view taken along the line K—K in FIG. 4 which shows an adjusting pin at a position ② in FIG. 6.
Figure 8B:
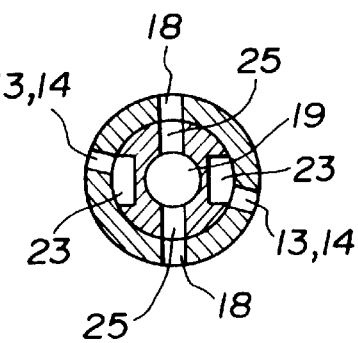
FIG. 8(b) is a cross-sectional view taken along the lines L—L and M—M in FIG. 4 which shows an adjusting pin at a position ② in FIG. 6.
Figure 8C:
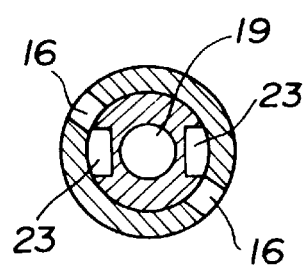
FIG. 8(c) is a cross-sectional view taken along the line N—N in FIG. 4 which shows an adjusting pin at a position ② in FIG. 6.
Figure 9A:
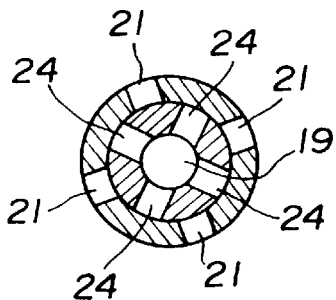
FIG. 9(a) is a cross-sectional view taken along the line K—K in FIG. 4 which shows an adjusting pin at a position ③ in FIG. 6.
Figure 9B:
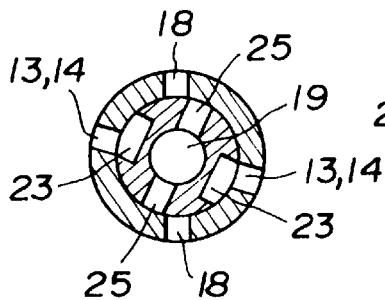
FIG. 9(b) is a cross-sectional view taken along the lines L—L and M—M in FIG. 4 which shows an adjusting pin at a position ③ in FIG. 6.
Figure 9C:
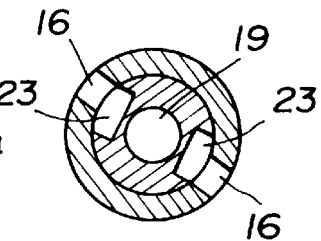
FIG. 9(c) is a cross-sectional view taken along the line N—N in FIG. 4 which shows an adjusting pin at a position ③ in FIG. 6.

With the above arrangements, rotation of the adjusting pin 40 causes a damping coefficient of the shock absorber SA to vary at multiple stages, as shown in FIG. 5, within a range from the lowest damping coefficient (hereinafter, referred to as a softer damping position) to the highest damping coefficient (hereinafter, referred to as a harder damping position) during bounding and rebounding strokes.

Referring to FIG; 6, a relation between a position of the adjusting pin 40 and damping force characteristics of the shock absorber SA is shown. When the adjusting pin 40 is rotated in a counterclockwise direction from the position ② (in a softer damping range SS wherein the lowest damping coefficients are established during both bounding and rebounding strokes) to the position ①, the damping coefficient is increased toward the harder damping position (in a rebounding harder damping range HS) only in the rebounding stroke (i.e., during extension). Alternatively, rotating the adjusting pin 40 in a clockwise direction to the position ③ causes the damping coefficient to change toward the harder damping position (in a bounding harder damping range SH) only in the bounding stroke (i.e., during compression) without any change in the rebounding stroke.

It will be noted that, in FIG. 6, when the adjusting pin 40 is rotated and halted at the three positions ①, ②, and ③, the cross-sectional situations of the adjusting pin taken along the line K—K, along the line M—M, and along the line N—N are shown in FIGS. 7(A), 8(A), and 9(A), FIGS. 7(B), 8(B), and 9(B), and FIGS. 7(C), 8(C), and 9(C) respectively.

Figure 10:
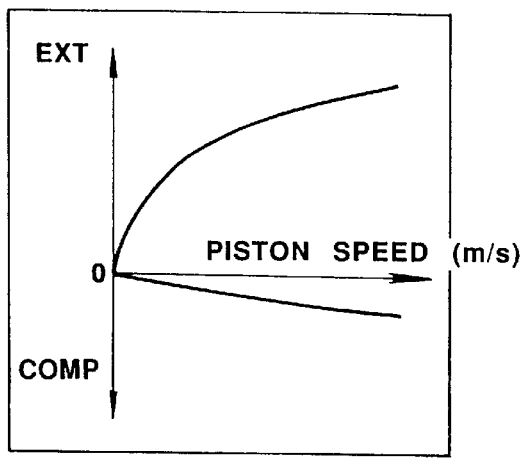
FIGS. 10, 11, and 12 are graphs which show relations between piston speed and damping force when an adjusting pin is arranged at positions ①, ②, and ③ in FIG. 6 respectively.
Figure 11:
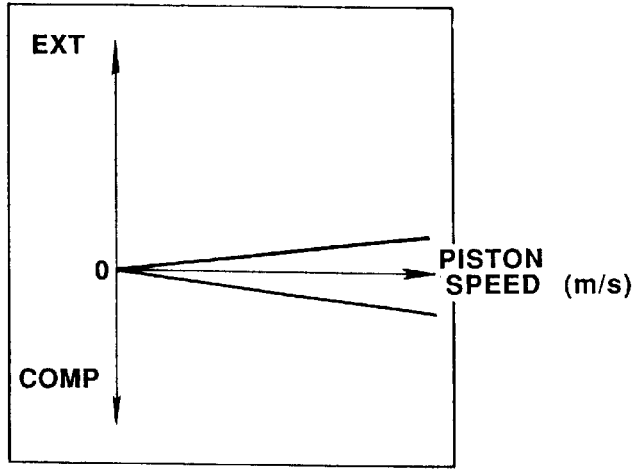
Figure 12:
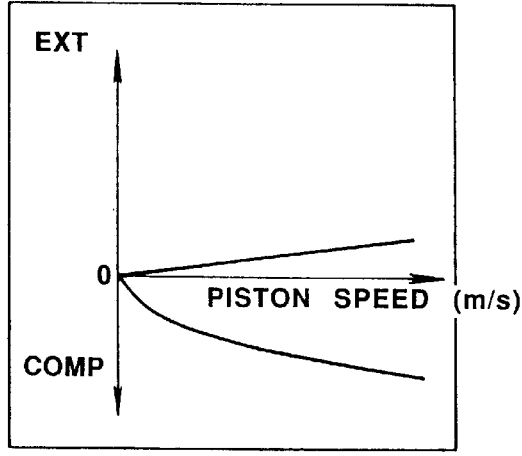

In addition, the damping force characteristics at the positions ①, ②, ③ of the adjusting pin 40 are shown in FIGS. 10, 11, and 12.

Figure 13:
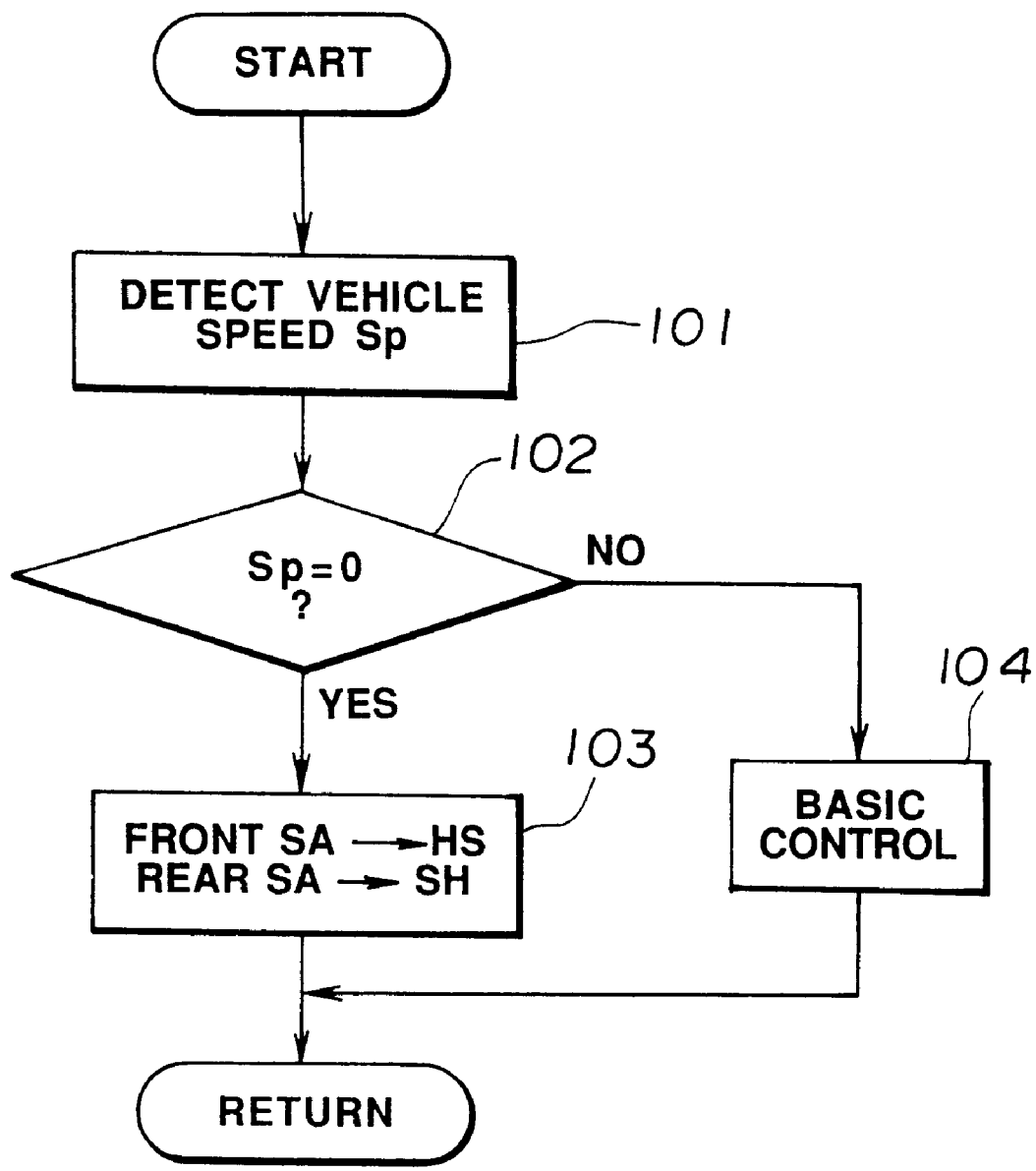
FIGS. 13 and 14 are flowcharts which show logical steps performed by a control unit of a suspension control system.
Figure 14:
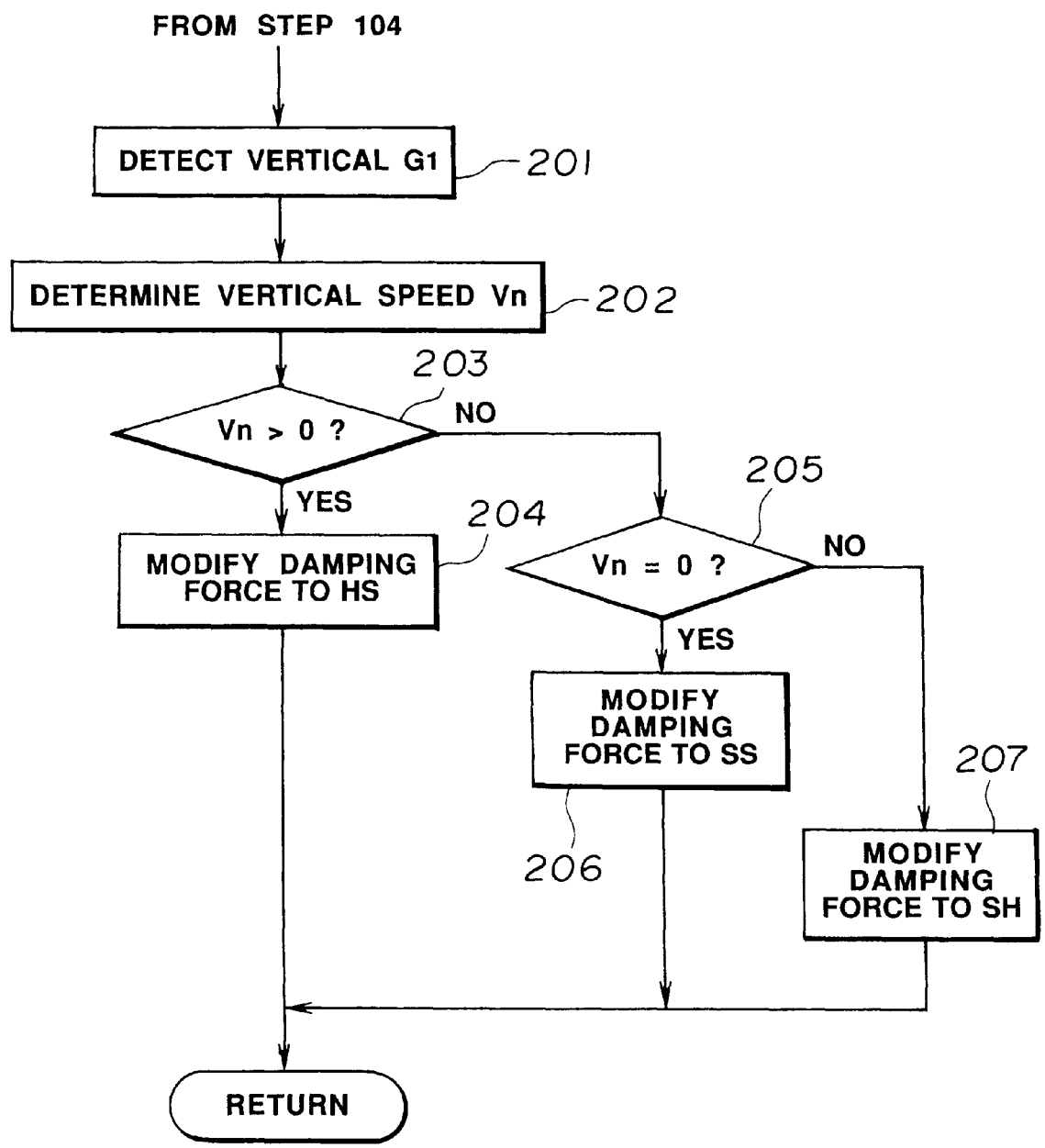

Referring to FIGS. 13 and 14, there is shown a flowchart of a program or sequence of the logical steps performed by the control unit 4 for controlling a position of the pulse motor 3 to modify a damping position, or damping force characteristics of the shock absorbers SA for anti-squatting motion control. The damping force characteristics modification control, as discussed below, is carried out for every shock absorber SA.

After entering the program, the routine proceeds to step 101 wherein the control unit 4 monitors vehicle speed Sp based on a signal from the vehicle speed sensor 5. The routine then proceeds to step 102 wherein it is determined whether the vehicle speed Sp is zero or not. If a NO answer is obtained in step 102, the routine then proceeds to step 104 to perform basic control of damping force characteristics, as will be described hereinafter in detail. Alternatively, if a YES answer is obtained in step 102 concluding that the vehicle is parked, the routine proceeds to step 103 wherein the front shock absorbers $SA_1$ and $SA_2$ are controlled to assume the damping force characteristics in the rebounding harder damping range HS, while the rear shock absorbers $SA_3$ and $SA_4$ are controlled to exhibit the damping force characteristics in the bounding harder damping range SH. After steps 103 or 104, the routine returns to the initial step.

With the above modification of the damping force characteristics, when the vehicle has been stopped, the damping force characteristics of the front shock absorbers $SA_1$ and $SA_2$ are modified to in the rebounding harder damping range HS, while the damping force characteristics of the rear shock absorbers $SA_3$ and $SA_4$ are modified to in the bounding harder damping range SH to avoid squatting motion which causes the rear of the vehicle body to be lowered and the front thereof to rise as a result of acceleration when the vehicle starts.

Referring to FIG. 14, after step 104, the routine proceeds to step 201 wherein the control unit 4 monitors vertical acceleration $G_1$ acting on a portion of the vehicle body adjacent a road wheel based on a signal from the vertical G sensor 1. The routine then proceeds to step 202 wherein the vertical acceleration $G_1$ is integrated to determine vertical speed $V_n$. When the vertical speed $V_n$ is in an upward direction, a positive signal is provided, while it is in a downward direction, a negative signal is provided.

The routine then proceeds to step 203 wherein it is determined whether the vertical speed $V_n$ is greater than zero or not. If a YES answer is obtained concluding that the vertical speed $V_n$ is greater than zero, that is, that the vehicle body is rising, the routine then proceeds to step 204 wherein the shock absorber SA is controlled to assume the damping force characteristics in the rebounding harder damping range HS.

Alternatively, if a NO answer is obtained in step 203 concluding that the vertical speed $V_n$ is less than or equal to zero, the routine then proceeds to step 205 wherein it is determined whether the vertical speed $V_n$ is substantially zero or not. If a YES answer is obtained, the routine then proceeds to step 206 wherein the shock absorber SA is controlled to assume the damping force characteristics in the softer damping range SS. Alternatively, if a NO answer is obtained in step 205 concluding that the vertical speed $V_n$ is in the downward direction, that is, that the vehicle body is being lowered, the routine then proceeds to step 207 wherein the damping force characteristics are modified to in the bounding harder damping range SH.

After steps 204, 206, or 207, the routine returns back to the initial step 101 as shown in FIG. 13.

In the above suspension control, the damping force characteristics of the shock absorber SA are switched based on the magnitude of the vertical speed $V_n$, however, they may be modified based on determination of whether the vertical speed $V_n$ and relative speed between the vehicle body and the wheel are in the same direction or opposite directions.

Figure 15:
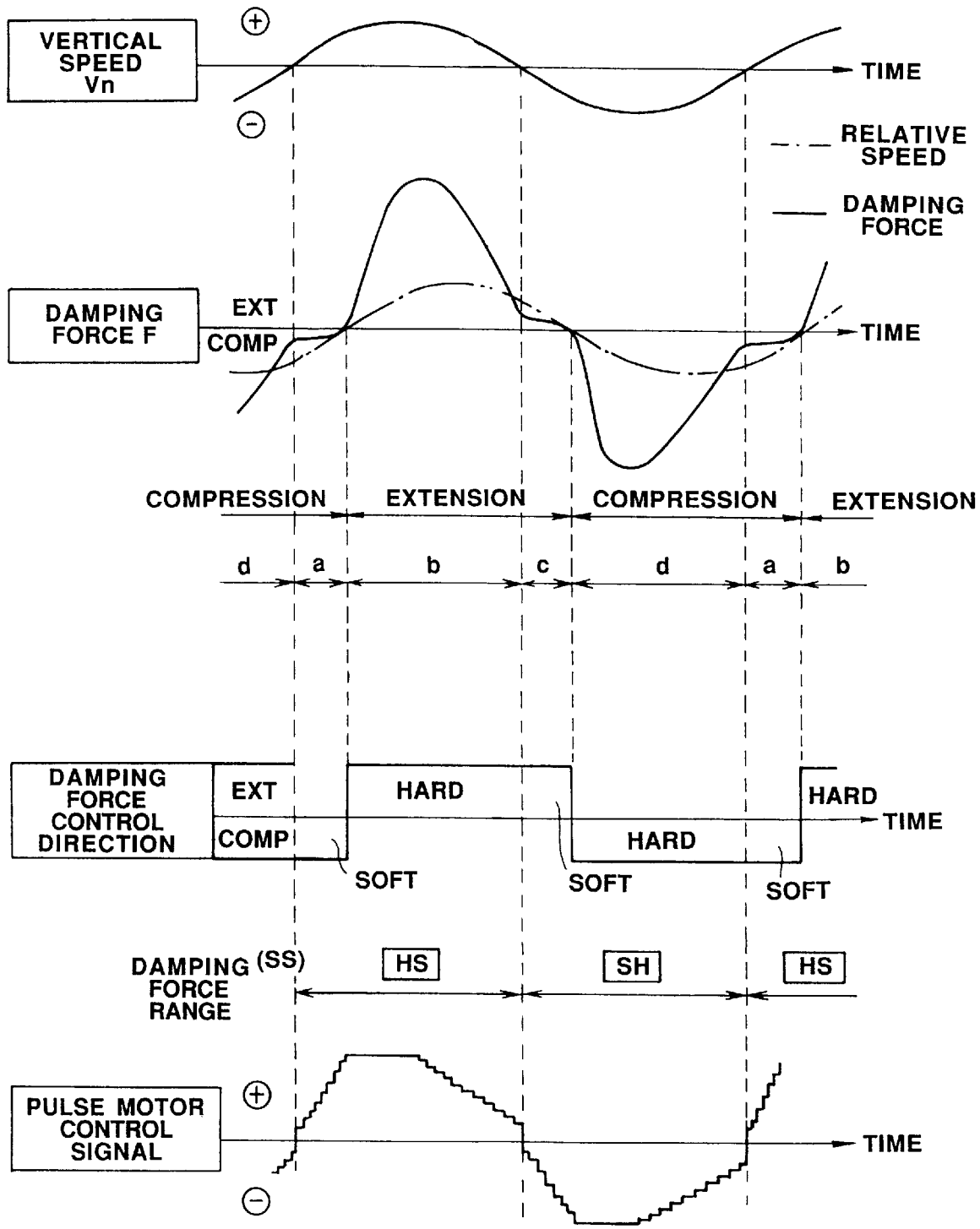
FIG. 15 is a time-chart which shows operation of damping coefficient control performed by a suspension control system for suppressing vehicle attitude change.

Referring to FIG. 15, there is show a time-chart which represents the operation of the suspension control system.

Assuming that the vertical speed $V_n$ varies according to a sine curve, when the vertical speed $V_n$ is in the upward direction (i.e., a positive value), the shock absorber SA is controlled to assume the damping force characteristics in the rebounding harder damping range HS wherein a damping coefficient C is increased in proportion to a value of the vertical speed $V_n$ ($C=k \cdot V_n$) only in the rebounding stroke while maintaining the lower damping coefficient in the bounding stroke.

When the vertical speed $V_n$ is in the downward direction (i.e., a negative value), the shock absorber SA is controlled to exhibit the damping force characteristics in the bounding harder damping range SH wherein the damping coefficient C is increased in proportion to a value of the the vertical speed $V_n$ ($C=k \cdot V_n$) only in the bounding stroke while maintaining the lower damping coefficient in the rebounding stroke.

With the above damping coefficient modification, the same damping force characteristic control as that according to the so-called skyhook theory may be carried out without detecting relative speed between the vehicle body and the wheel (i.e., between unsprung and sprung portions) so that when the vertical speed $V_n$ and the relative speed between the vehicle body and the wheel are in the same direction, the damping coefficient of the shock absorber SA, as shown in the ranges b and d in FIG. 15, is modified to a higher value (i.e., the harder damping characteristics), while when the vertical speed $V_n$ and the relative speed are in opposite directions, the damping coefficient of the shock absorber SA, as shown in the ranges a and c in FIG. 15, is modified to a lower value (i.e., the softer damping characteristics). Additionally, it will be noted that the damping force characteristics may be changed without driving the pulse motor 3 during transition periods between the rages a and b and between the ranges c and d.

This embodiment is, as described above, able to modify the damping force characteristics according to the shyhook theory only utilizing the vertical G sensors. Therefore, the number of parts which make up the system may be decreased as well as reduction in mounting space, weight, and assembling processes of the system. Additionally, the number of changing operations of the damping force characteristics of the shock absorber SA may be reduced as compared with the conventional damping force characteristics control, resulting in a control response rate as well as durability of the pulse motors 3 being improved.

Figure 16:
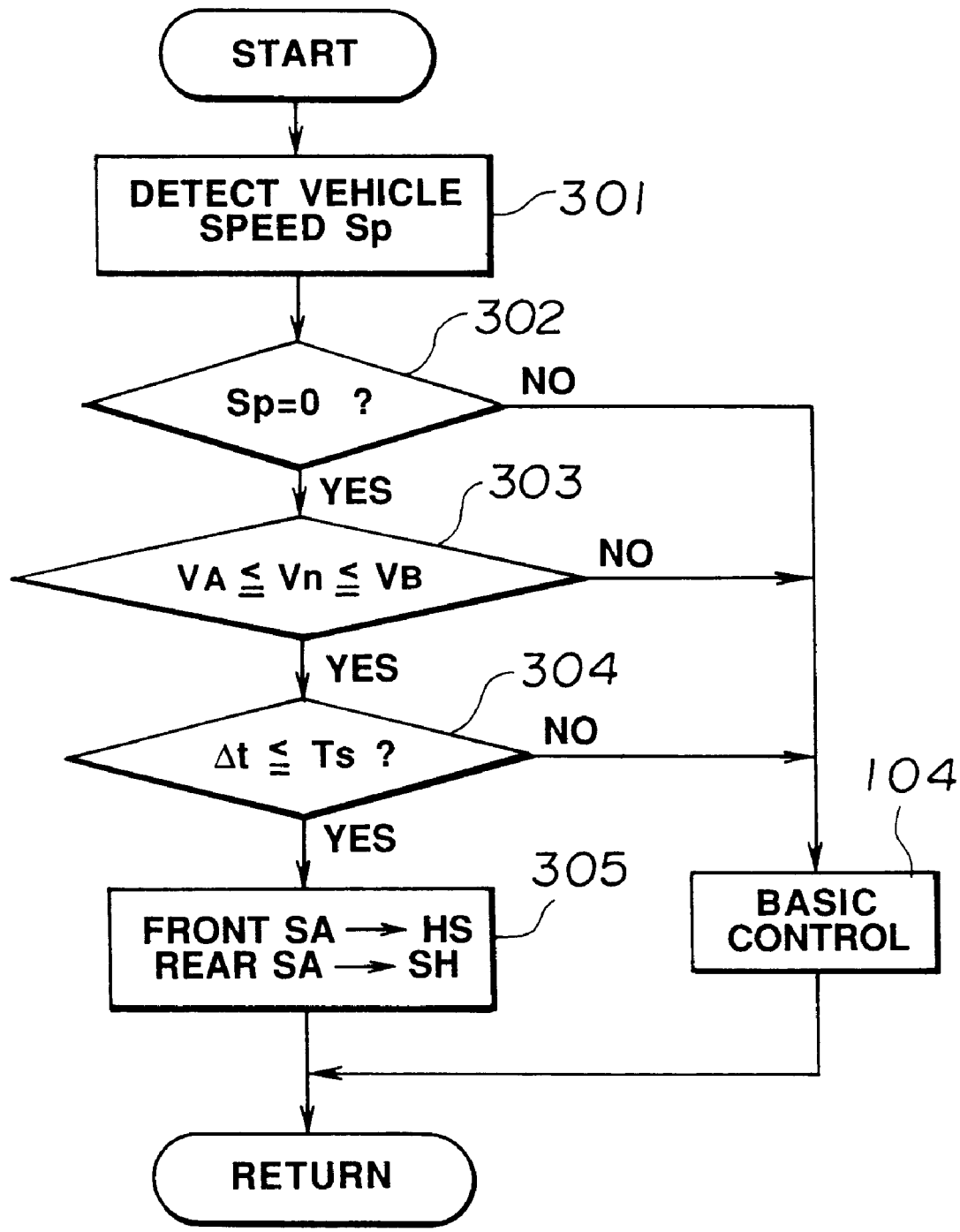
FIGS. 16 show a flowchart which shows an alternative embodiment of the invention.
Figure 17:
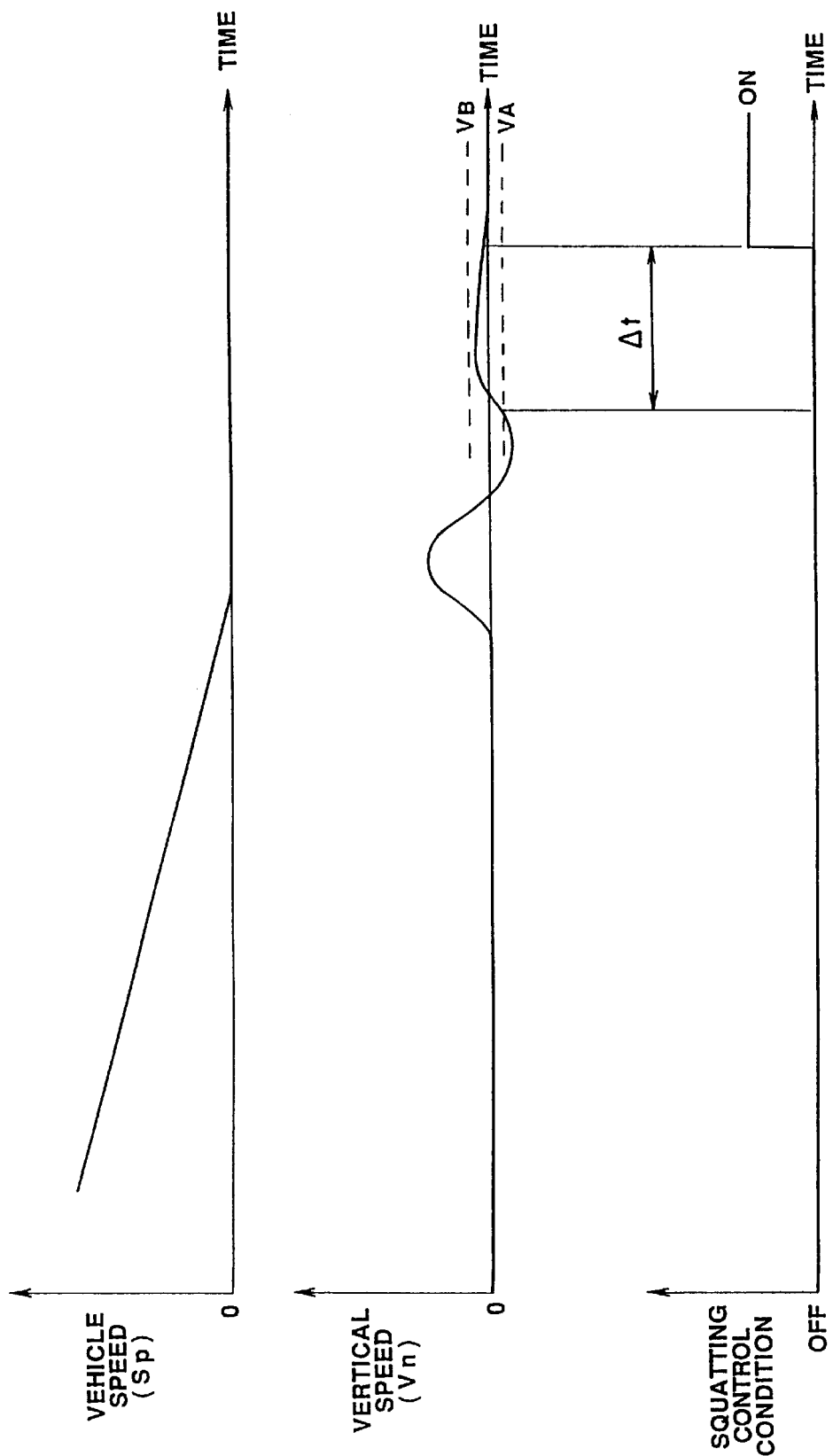
FIG. 17 is a time-chart which shows the operation of anti-squatting motion control according to the flowchart as shown in FIG. 16.

Referring to FIGS. 16 and 17, there is shown an alternate embodiment of the suspension control according to the present invention.

In the flowchart as shown in FIG. 16, the routine, after entering the program, proceeds to step 301 wherein the control unit 4 monitors the vehicle speed Sp. The routine then proceeds to step 302 wherein it is determined whether the vehicle speed Sp is zero or not. If a NO answer is obtained, the routine then proceeds to step 104 as already discussed in FIG. 13 wherein the basic suspension control is carried out. Alternatively, if a YES answer is obtained in step 302 concluding that the vehicle is stopped, the routine proceeds to step 303 wherein it is determined whether the vertical speed $V_n$ is greater than or equal to a preselected first threshold value $V_A$ and smaller than or equal to a preselected second threshold value $V_B$ or not. If a NO answer is obtained, the routine then proceed to step 104. Alternatively, if a YES answer is obtained concluding that the vertical speed $V_n$ falls within the range of the first to second threshold values $V_A$ and $V_B$, the routine then proceeds to step 304 wherein it is determined whether a period of time Ts during which the vertical speed $V_n$ falls within the range from the first to second threshold values $V_A$ and $V_B$ exceeds a preselected threshold value Δt or not. If a NO answer is obtained, the routine then proceeds to step 104. Alternatively, if a YES answer is obtained, the routine then proceeds to step 305 wherein the front shock absorbers $SA_1$ and $SA_2$ are controlled to assume the damping force characteristics in the rebounding harder damping range HS, while the rear shock absorbers $SA_3$ and $SA_4$ are controlled to exhibit the damping force characteristics in the bounding harder damping range SH. After steps 305 or 104, the routine returns to the initial step.

With the above damping force characteristic control, when the vehicle, as shown in FIG. 17, is brought to a stop and the vertical speed $V_n$ falls within the range from the first to second threshold values $V_A$ and $V_B$ so that vertical vibrations of the vehicle body caused by longitudinal acceleration as a result of braking operation is suppressed, the damping force characteristics of the front shock absorbers $SA_1$ and $SA_2$ are modified to in the rebounding harder damping range HS, while the damping force characteristics of the rear shock absorbers $SA_3$ and $SA_4$ are modified to in the bounding harder damping range SH. Thus, the suspension control system of this embodiment is able to suppress squatting of a vehicle body which may occur when starting, while assuring suitable damping force characteristics during parking.

Figure 18:
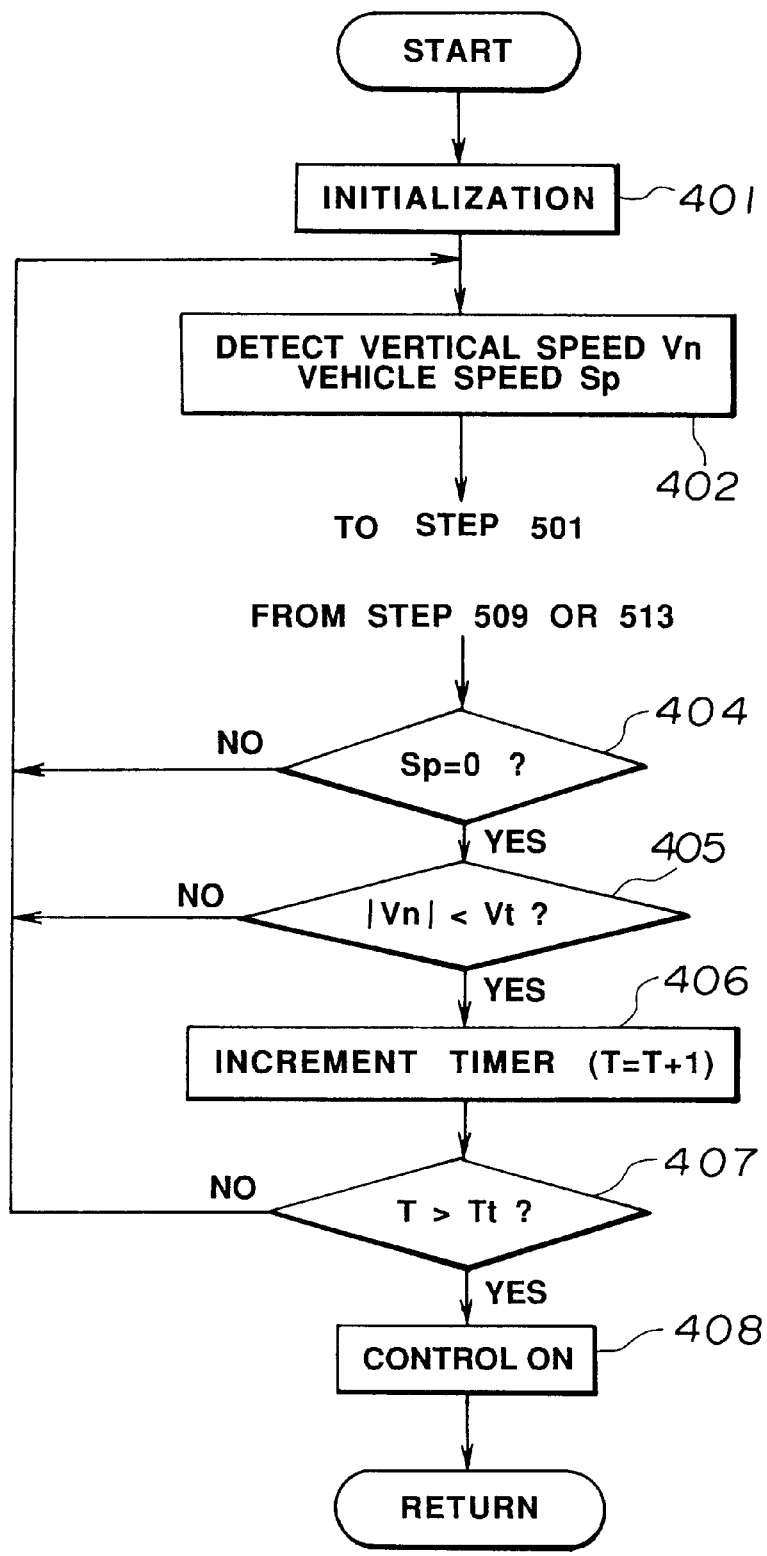
FIGS. 18 and 19 are flowcharts which show a third embodiment of damping coefficient control according to the invention.
Figure 19:
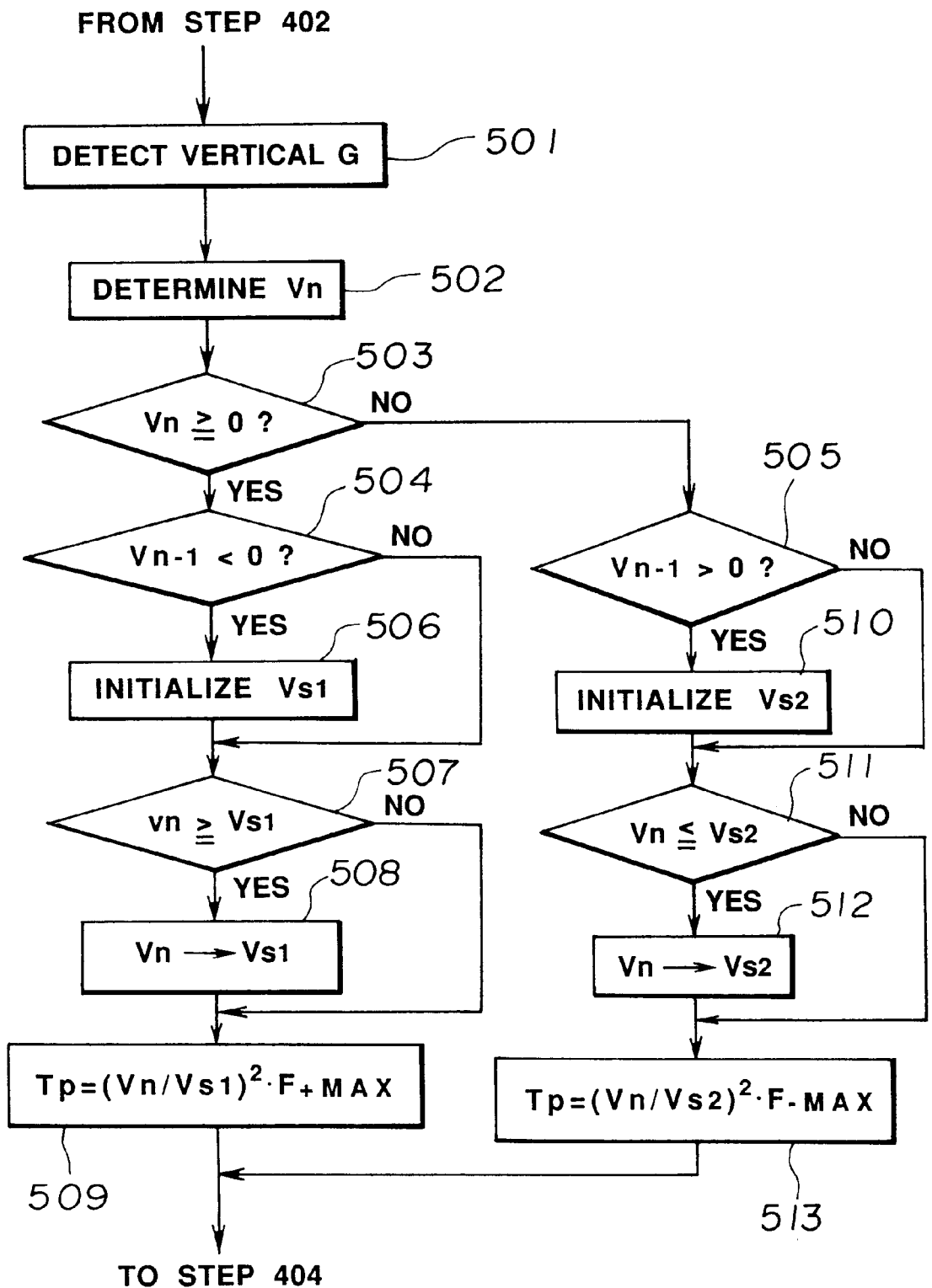

Referring to FIGS. 18 and 19, there is shown flowcharts of a third embodiment of the invention.

After entering the program, the routine proceeds to step 401 wherein the control unit 4 provides a control signal to the pulse motor 3 to adjust same to an initial position. The routine then proceeds to step 402 wherein the control unit 4 monitors the vertical speed $V_n$ and the vehicle speed Sp. Afterward, the routine proceeds to step 501 in the subprogram as shown in FIG. 19, as will be described hereinafter in detail.

After termination of the logical steps in FIG. 19, the routine returns back to step 404 wherein it is determined whether the vehicle speed Sp is zero or not. If a NO answer is obtained, the routine then returns to step 402. Alternatively, if a YES answer is obtained concluding that the vehicle is traveling, the routine then proceeds to step 405 wherein it is determined whether an absolute value of the vertical speed $V_n$ is smaller than a preselected threshold value Vt or not. If a NO answer is obtained, the routine then returns to step 402. If a YES answer is obtained ($|V_n|<Vt$), the routine then proceeds to step 406 wherein a count value T of a timer provided in the control unit 4 is incremented. In step 407, it is determined whether the count value T is greater than a preselected threshold value Tt or not. If a NO answer is obtained, the routine then returns to step 402. If a YES answer is obtained (T>Tt) concluding that a predetermined period of time has been elapsed after the vehicle stops, the routine then proceeds to step 408 wherein parking suspension control is initiated so that the pulse motor 3 is held at a preselected position in the rebounding harder damping range HS.

Figure 20:
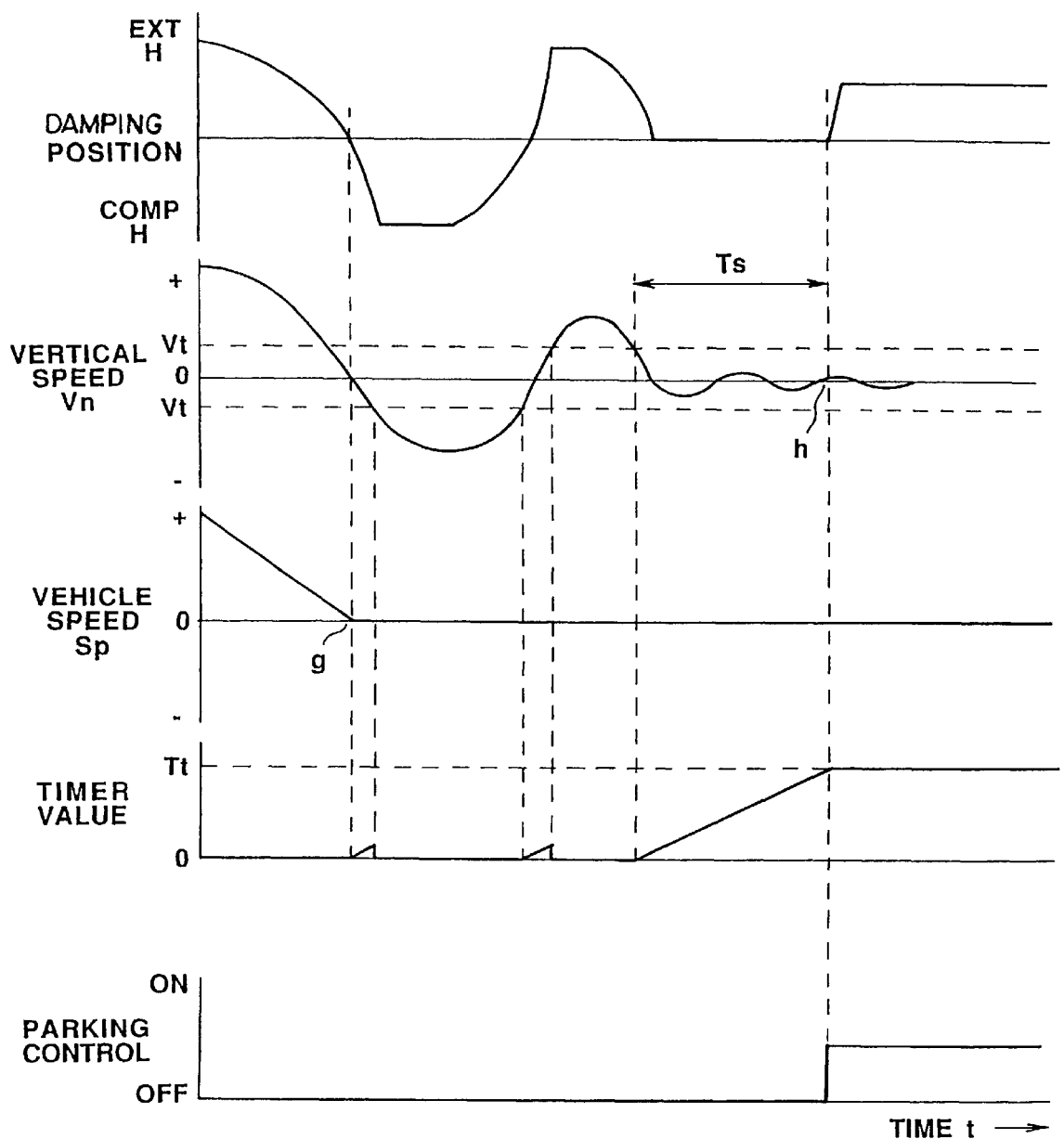
FIG. 20 is a time-chart which shows damping force control operation after a vehicle is stopped.

With the above damping force characteristic control, when the vehicle speed Sp becomes substantially zero at the time g in FIG. 20 and the vertical speed $V_n$ falls in the range of ±Vt over the period of time Tt at the time h, that is, when pitching and/or bouncing motion of the vehicle body caused by nose dive and reaction therefrom becomes smaller than a preselected degree, the shock absorber is held at the preselected position within the rebounding harder damping range HS. Therefore, even when the vehicle body vibrates due to passengers getting in and/or out of the vehicle, the damping force characteristics are maintained constant.

Referring to FIG. 19, the subroutine carried out after step 402 in FIG. 18 will be discussed below.

In step 501, the control unit 4 monitors the vertical acceleration $G_1$. The routine then proceeds to step 502 wherein the vertical acceleration $G_1$ is integrated to determine the vertical speed $V_n$ which represents a positive value in an upward direction and a negative value in a downward direction.

Afterward, the routine proceeds to step 503 wherein it is determined whether the vertical speed $V_n$ is greater than or equal to zero or not. If a YES answer is obtained ($V_n \geq 0$), the routine then proceeds to step 504 wherein it is determined whether the vertical speed $V_{n-1}$ one program cycle before is smaller than zero or not. This determination is made for determining whether a direction of the vertical speed $V_n$ has been changed or not. If a NO answer is obtained in step 504, the routine then proceeds directly to step 507. Alternatively, if a YES answer is obtained ($V_{n-1}<0$) concluding that the direction of the vertical speed has been changed, the routine then proceeds to step 506 wherein a threshold value $V_{S1}$ for the vertical speed $V_n$ is initialized to a preselected value. In step 507, it is determined whether the vertical speed $V_n$ is greater than or equal to the threshold value $V_{S1}$ or not. If a NO answer is obtained, the routine then proceeds directly to step 509. If a YES answer is obtained in step 507, the routine then proceeds to step 508 wherein the threshold value $_{S1}$ is updated to the current value of the vertical speed $V_n$. The routine then proceeds to step 509 wherein a target damping position $T_P$ (i.e., a damping coefficient) of the shock absorber SA in the rebounding stroke is determined according to the relation of $T_P=(V_n/V_{S1})^2 \times F_{+MAX}$ where $F_{+MAX}$ is a position where the maximum damping force is generated in the rebounding stroke. The squaring a value of $V_n/V_{S1}$ in the above equation corrects damping force characteristics linearly with respect to the vertical speed $V_n$.

If a NO answer is obtained in step 503, the routine then proceeds to step 505 wherein it is determined whether the vertical speed $V_{n-1}$ one program cycle before is greater than zero or not to determine whether a direction of the vertical speed $V_n$ has been changed or not. If a NO answer is obtained, the routine then proceeds directly to step 511. Alternatively, if a YES answer is obtained ($V_{n-1}>0$) concluding that the direction of the vertical speed has not been changed, the routine then proceeds to step 510 wherein a threshold value $V_{S2}$ for the vertical speed $V_n$ is initialized to a preselected value. In step 511, it is determined whether the vertical speed $V_n$ is smaller than or equal to the threshold value $V_{S2}$ or not. If a NO answer is obtained, the routine then proceeds directly to step 513. If a YES answer is obtained in step 511 concluding that the vertical speed $V_n$ becomes greater than the threshold value $V_{S2}$ i a negative direction, the routine then proceeds to step 512 wherein the threshold value $_{S2}$ is updated to the current value of the vertical speed $V_n$. The routine then proceeds to step 513 wherein a target damping position $T_P$ (i.e., a damping coefficient) of the shock absorber SA in the bounding stroke is determined according to the relation of $T_P=(V_n/V_{S2})^2 \times F_{-MAX}$ where $F_{-MAX}$ is a position at which the maximum damping force is generated in the bounding stroke.

After steps 509 or 513, the routine proceeds to step 404 as already mentioned in FIG. 18.

Figure 21:
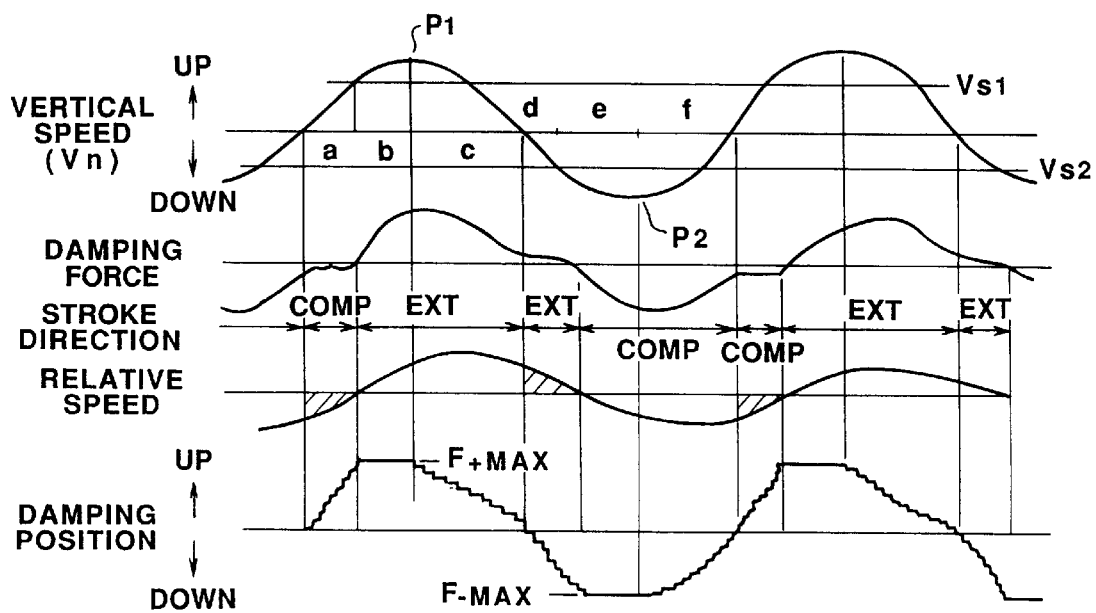
FIGS. 21 and 22 are time-charts which show basic damping force control operation of a third embodiment of the invention.
Figure 22:
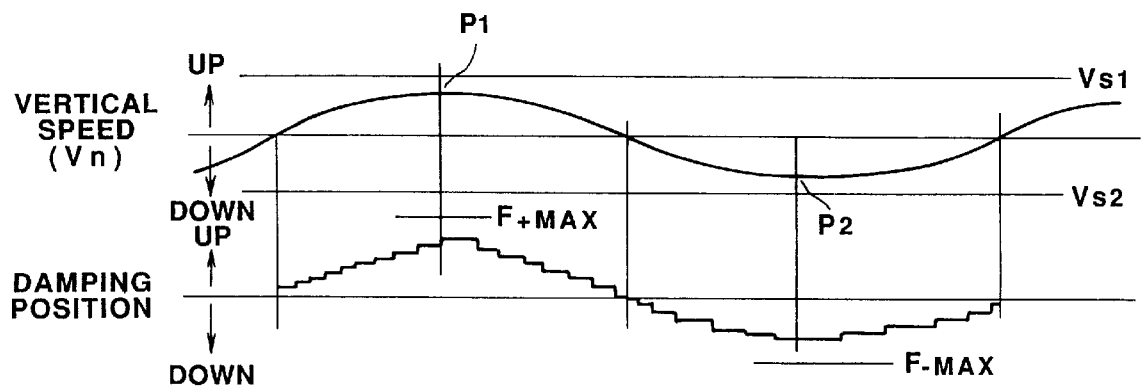

Referring to FIGS. 21 and 22, time-charts are shown which represent the operation of damping force control performed according to the flowcharts as shown in FIGS. 18 and 19.

FIG. 21 shows variations in the vertical speed $V_n$, damping force F, a stroke direction, relative speed between the vehicle body and the wheel, and a damping position (i.e., a damping coefficient) of the shock absorber SA. In this time-chart, the vertical speed $V_n$ varies according to a sine curve over the range of bounding to rebounding strokes, the peak values $P_1$ and $P_2$ of the vertical speed $V_n$ are greater than the threshold values $V_{S1}$ and $V_{S2}$ respectively which are initialized in steps 506 and 510.

In the range "a", the vertical speed $V_n$ is directed upward below the initial threshold value $V_{S1}$. Under these conditions, a damping coefficient of the shock absorber in the rebounding stroke is modified in proportional to a value of the vertical speed $V_n$. At this time, the shock absorber SA is, however, in the bounding stroke and thus the bounding softer damping characteristics (i.e., the lowest damping position) are provided to serve to suppress lifting motion of the vehicle body caused by vibration input from a road surface.

In the range "b" which is defined between the initial threshold value $V_{S1}$ and the peal value $P_1$, according to steps 507 and 508 as shown in FIG. 19, the threshold value $V_{S1}$ is sequentially updated to agree with a value of the vertical speed $V_n$. Therefore, the damping position or damping coefficient of the shock absorber SA is maintained at the maximum rebounding damping position $+F_{MAX}$ until the peak value $P_1$ is reached. This increase in damping force during the rebounding stroke suppresses upward vibrations of the vehicle body effectively.

In the range "c" between the peak value $P_1$ and zero (0) of the vertical speed $V_n$, since the threshold value $V_{S1}$ has been updated to the peak value $P_1$ when the vertical speed $V_n$ reaches the peak value $P_1$, a value of the square of $V_n/V_{S1}$ in the equation in step 509 indicates less than one (1) and thus decrease in the vertical speed $V_n$ below the peak value $P_1$ causes the damping position or damping coefficient of the shock absorber SA in the rebounding stroke to be reduced in proportional to reduction in the vertical speed $V_n$. The damping coefficient of the shock absorber SA may alternatively be regulated after a preselected period of time from a time when the vertical speed $V_n$ reaches the peak value $P_1$.

In the range "d" of the vertical speed $V_n$ from zero (0) to the negative threshold value $P_{S1}$, a damping coefficient of the shock absorber in the bounding stroke is modified in proportional to a value of the vertical speed $V_n$. At this time, the shock absorber SA is, however, in the rebounding stroke and thus the rebounding softer damping characteristics (i.e., the lowest damping position) are provided to serve to suppress lowering motion of the vehicle body caused by vibration input from a road surface.

In the range "e" of the vertical speed $V_n$ from the initial threshold value $V_{S2}$ to the peal value $P_2$, according to steps 511 and 512 as shown in FIG. 19, the threshold value $V_{S2}$ is updated to agree with a value of the vertical speed $V_n$. Therefore, the damping position or damping coefficient of the shock absorber SA is maintained at the maximum bounding damping position $-F_{MAX}$ until the peak value $P_2$ is reached, thereby increasing the damping coefficient during the bounding stroke so as to suppress a downward vibration of the vehicle body effectively.

In the range "f" between the peak value $P_2$ and zero (0) of the vertical speed $V_n$, since the threshold value $V_{S2}$ has already been updated to the peak value $P_2$ when the vertical speed $V_n$ reaches the peak value $P_2$, the square of $V_n/V_{S2}$ in the equation in step 513 indicates less than one (1) and thus increase in the vertical speed $V_n$ above the peak value $P_2$ causes the damping position or damping coefficient of the shock absorber SA in the bounding stroke to be reduced in proportional to reduction in the vertical speed $V_n$.

Referring to FIG. 22, the relation between the vertical speed $V_n$ and the damping position (i.e., a damping coefficient) is shown wherein the vertical speed $V_n$ varies according to a sine curve over bounding and rebounding strokes within the range from the initial threshold values $V_{S1}$ to $V_{S2}$.

When the vertical speed $V_n$, as can be seen in the drawing, varies within the range from the initial threshold values $V_{S1}$ to $V_{S2}$, the damping position or damping coefficient of the shock absorber SA in the same stroke as the vertical speed $V_n$ is modified in proportional to a value of the vertical speed $V_n$.

With the above damping characteristic control, as already mentioned, within the range between the initial threshold values $V_{S1}$ and $V_{S2}$, the shock absorber SA is controlled to assume the damping force characteristics according to the vertical speed $V_n$ in the same direction of stroke as the vertical speed $V_n$. After the vertical speed $V_n$ exceeds the threshold value $V_{S1}$ or $V_{S2}$, the threshold value is updated to coincide with the vertical speed $V_n$ sequentially until the vertical speed $V_n$ falls within the range between the threshold values $V_{S1}$ and $V_{S2}$ so that the shock absorber SA is maintained at the preselected maximum damping position in the same direction of stroke as the vertical speed $V_n$. Accordingly, vibrations of the vehicle body due to low frequency input from a road surface are damped effectively while high frequencies caused by protrusions on the road surface are damped with the lower damping force characteristics for assuring vehicle riding comfort.

Additionally, vibrations of the vehicle body caused by nose dive and reaction therefrom are suppressed with the harder damping force characteristics, in the same direction of stroke as the vertical speed $V_n$, variable according to a value of the vertical speed $V_n$.

When the vehicle has passed over protrusions on a road surface, the softer damping force characteristics in a stroke of direction opposite the vertical speed $V_n$ prevents the vibrations from the road surface from being transmitted to the vehicle body.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, while the above mentioned suspension control system switches a damping coefficient between the harder and softer damping force characteristics based on the vertical speed $V_n$, the switching operation of the damping coefficient may be made based on determination of whether the vertical speed $V_n$ and the relative speed between the vehicle body and the wheel are in the same direction or not.

Additionally, in the above suspension control system, when a damping coefficient of the shock absorber either in bounding or rebounding strokes is modified to a higher damping coefficient to assume the harder damping characteristics, while a damping coefficient in the other stroke is modified to a lower damping coefficient to exhibit the softer damping characteristics. However, the same damping coefficient may be provided both in the bounding and rebounding strokes.

Further, the damping coefficient of the shock absorber SA may be decreased according to the vertical speed $V_n$ as well as vehicle speed.

What is claimed is:

1. A suspension control system for an automotive vehicle comprising:

a front shock absorber disposed between a vehicle body and a suspension member rotatably supporting a front wheel, said front shock absorber being controllable to assume damping force characteristics in a range between preselected higher and lower damping coefficients over extension and compression strokes;

a rear shock absorber disposed between the vehicle body and a suspension member rotatably supporting a rear wheel, said rear shock absorber being controllable to assume damping force characteristics in the range between the preselected higher and lower damping coefficients over extension and compression strokes;

vehicle speed sensor means for detecting vehicle speed and providing a signal indicative thereof; and control means responsive to the signal from said vehicle speed sensor means to provide control signals for controlling said front and rear shock absorbers in a manner wherein the damping force characteristics of said front shock absorber in the extension stroke and of said rear shock absorber in the compression stroke are modified to and maintained at the higher damping coefficients respective whenever the vehicle speed is substantially zero.

2. A suspension control system as set forth in claim 1, further comprising vehicle attitude change detecting means for detecting vehicle attitude change and providing a signal indicative thereof, said control means providing the signals to control said front and rear shock absorbers so that the damping force characteristics of said front shock absorber in the extension stroke and of said rear shock absorber in the compression stroke are modified to the higher damping coefficients respectively when both the vehicle speed is substantially zero and the vehicle attitude change is below a preselected degree.

3. A suspension control system as set forth in claim 2, wherein said vehicle attitude detecting means includes vertical speed determining means for determining a vertical vehicle speed of the vehicle body.

4. A suspension control system as set forth in claim 3, wherein said control means is operable to hold the damping force characteristics at a preselected damping coefficient when the vehicle speed is substantially zero and the vertical speed remains below a preselected threshold value for a preselected period of time.

5. A suspension control system as set forth in claim 3, wherein said control means provides the signals to control said front and rear shock absorbers so that the damping force characteristics of said front shock absorber in the extension stroke and of said rear shock absorber in the compression stroke are modified to the higher damping coefficients respectively when the vehicle speed is substantially zero and the vertical speed falls within a range between preselected first and second vertical speed threshold values, said first and second vertical speed threshold values both being greater than zero.

6. A suspension control system as set forth in claim 5, wherein said first and second threshold values are updated to a value of the vertical speed until a direction of the vertical speed is changed after the vertical speed lies out of the range between said first and second threshold values.

7. A suspension control system as set forth in claim 1, wherein each of the shock absorbers is controlled to assume damping force characteristics over: a softer damping range wherein the lowest damping coefficients is established during both bounding and rebounding strokes of the shock absorber, a rebounding harder damping range wherein the damping force characteristics are modified toward the higher damping coefficient only in the rebounding stroke without any change in the bounding stroke, and a bounding harder damping range wherein the damping force characteristics are modified toward the higher damping coefficient only in the bounding stroke without any change in the rebounding stroke, said control means controlling the shock absorbers respectively to exhibit the damping force characteristics in the rebounding harder damping range when the vertical speed is in a direction of the rebounding stroke and to exhibit the damping force characteristics in the bounding harder damping range when the vertical speed is in a direction of the bounding stroke.

8. A suspension control system as set forth in claim 1, wherein said control means maintains said front and rear shock absorbers conditioned so that the extension stroke and compression stroke of said front and rear shock absorbers are respectively maintained at the higher damping coefficients, while the vehicle is stationary and/or parked.

9. A suspension control system as set forth in claim 1, wherein said front shock absorber and said rear shock absorber are both self-contained and free of any connection with an external source of hydraulic fluid under pressure.

10. A suspension control system for an automotive vehicle comprising:

shock absorbers disposed between a vehicle body and a suspension member rotatably supporting a wheel respectively, each shock absorber being controllable to assume damping force characteristics in a range between preselected higher and lower damping coefficients over extension and compression strokes;

vehicle speed sensor means for detecting vehicle speed and providing a signal indicative thereof;

vertical speed determining means for determining vertical speed of the vehicle body and providing a signal indicative thereof; and control means responsive to the signals from said vehicle speed sensor means and said vertical speed determining means to provide control signals for controlling said shock absorbers in a manner wherein the damping force characteristics of said shock absorbers are maintained at a preselected high damping coefficient within the range between the preselected higher and lower damping coefficients when the vehicle speed is substantially zero and the vertical speed is below a preselected threshold value for a preselected period of time.

11. A suspension control system as set forth in claim 10, wherein said shock absorbers include front and rear shock absorbers, said control means controlling said front and rear shock absorbers in a manner wherein the damping force characteristics of said front shock absorber in the extension stroke and of said rear shock absorber in the compression stroke are both modified to the higher damping coefficients respectively when the vehicle speed is substantially zero.

12. A suspension control system as set forth in claim 10, wherein said control means maintains said front and rear shock absorbers conditioned so that the extension stroke and compression stroke of said front and rear shock absorbers are respectively maintained at the higher damping coefficients, while the vehicle is stationary and/or parked.

13. A suspension control system as set forth in claim 10, wherein said shock absorbers are self-contained and free of any connection with an external source of hydraulic fluid under pressure.

* * * * *